United States Patent [19]

Brandenstein et al.

[11] Patent Number: 4,516,962
[45] Date of Patent: May 14, 1985

[54] TENSION ROLLER FOR DRIVE BELTS

[75] Inventors: Manfred Brandenstein, Eussenheim; Roland Haas, Hofheim; Ludwig Edelmann, Schweinfurt; Rüdiger Hans, Niederwerrn, all of Fed. Rep. of Germany

[73] Assignee: SKF Kugellagerfabriken GmbH, Schweinfurt, Fed. Rep. of Germany

[21] Appl. No.: 561,189

[22] Filed: Dec. 14, 1983

[30] Foreign Application Priority Data

Dec. 16, 1982 [DE] Fed. Rep. of Germany ... 8235715[U]

[51] Int. Cl.³ .............................................. F16H 7/10
[52] U.S. Cl. .................................... 474/112; 474/199
[58] Field of Search .................. 474/95, 96, 112, 199; 74/211

[56] References Cited

U.S. PATENT DOCUMENTS 4,443,210 4/1984 Olschewski et al. ............... 474/112

FOREIGN PATENT DOCUMENTS 3043287 11/1981 Fed. Rep. of Germany ...... 474/112
2086000 5/1982 United Kingdom ................ 474/112

Primary Examiner—Stephen J. Novosad
Assistant Examiner—Bruce M. Kisliuk
Attorney, Agent, or Firm—Yuter, Rosen & Dainow

[57] ABSTRACT

A tension roller for a drive belt is comprised of a two-part pin and a roller rotatably supported on the pin by a rolling bearing. One part of the pin is substantially solid and has a seating surface for receiving the inner ring of the rolling bearing. The other part of the pin is cup-shaped and extends over the seating surface to engage a side surface of the inner ring. An eccentric bore is provided in the pin for mounting the tension roller on a machine frame by means of a mounting screw. The eccentric bore, in the solid portion of the pin, extends to and separates the outer surface of the pin, whereby the mounting screw partially engages the inner ring of the bearing. The arrangement permits the maximum range of tension adjustments for the tension roller.

3 Claims, 2 Drawing Figures

TENSION ROLLER FOR DRIVE BELTS

FIELD OF THE INVENTION

This invention relates to a tension roller for drive belts.

BACKGROUND OF THE INVENTION

A tension roller for drive belts is disclosed, for example, in DE-GM8120032. The support body for the tension roller disclosed in this reference consists of two cup-shaped sleeves one of which is inserted in the other. A conventional rolling bearing is clamped between the side end face of one of the sleeves and a bulge in the region of the outer surface of the other sleeve, a roller being arranged on the outer ring of the rolling bearing. Eccentrically positioned bores are provided in the sleeves, and a screw extends therethrough for affixing the tension roller to a machine frame, whereby the tension roller as a whole is eccentrically pivotal about the screw. The screw extends through the inner space of the sleeve, so that the wall thickness of the sleeve limits the maximum eccentric position of the bore for the screw. Especially in the event that smaller roller bearings are to be provided for loading considerations, the tension range in known arrangements is ofttimes not achieved due to the small bores of the rolling bearings and the limited eccentric arrangements of the bores for the screws connected thereto. This disadvantage restricts the range of variation between rolling bearing size, tension roller diameter, and tension range in the known tension roller arrangement, so that the optimum tension roller arrangement has not been achieved.

SUMMARY OF THE INVENTION

It is therefore the object of the present invention to provide a tension roller for drive belts of the above type, in which an increased tension range is obtained, in comparison with a known arrangement, while still employing conventional rolling bearings.

In accordance with the invention this object is achieved by providing an arrangement in which the eccentric bore in the region of the seating surface of the rolling bearing is displaced up to the point at which it breaks out from the outer surface of the support body.

In the arrangements in accordance with the invention the shaft of the screw contacts the bore surface of the rolling bearing and is thereby eccentrically displaced to the greatest possible distance from the central line of the tension roller. This feature thereby enables the greatest possible tension range while employing conventional rolling bearings.

In an especially advantageous arrangement in accordance with the invention the rolling body is substantially solid and is provided with two symmetrically eccentric bores.

Due to the arrangement of the two symmetrically eccentric bores, the support body can be produced in a single process step by extrusion molding. The bores are necessary in this arrangement in accordance with the invention, in order to provide symmetrical material distribution, which aids in the production of the support by extrusion molding. Only one of the eccentric bores is needed in the use of the tension roller, the other bore contributing to a reduction of the weight of the device.

In accordance with a further feature of the invention the support body is comprised of a plastic material. This enables the production thereof in an especially simple manner, for example, by injection molding technique.

BRIEF DESCRIPTION OF THE DRAWINGS

In order that the invention will be more clearly understood, it will now be disclosed in greater detail with reference to the accompanying drawings, wherein.

DETAILED DESCRIPTION OF THE PREFERRED EMBODIMENT

Figure 1:
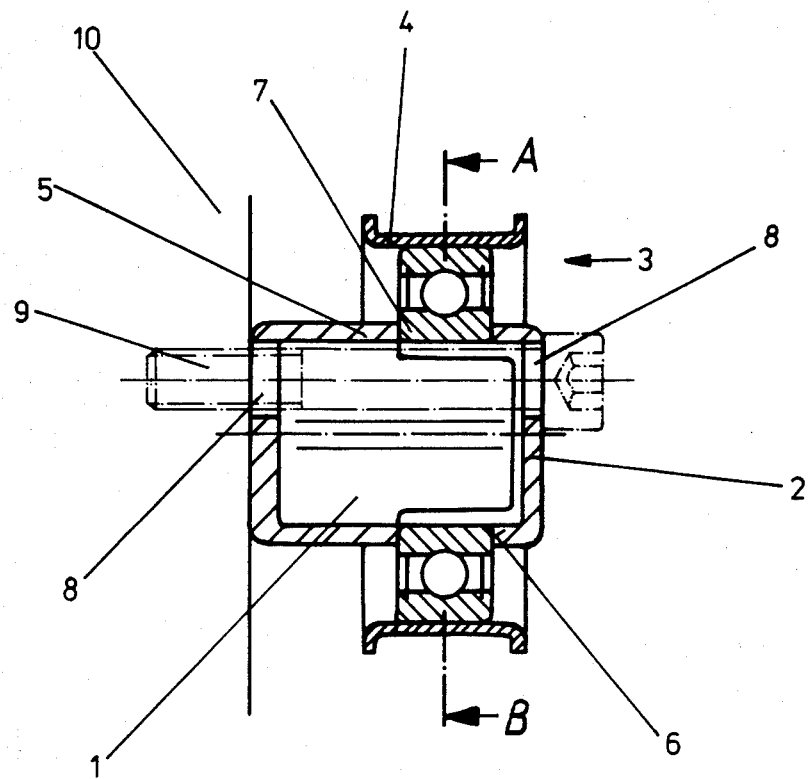
FIG. 1 is a longitudinal, cross-sectional view of a tension roller in accordance with the invention.

The tension roller illustrated in FIG. 1 is comprised of a two-part support body 1, 2, and a roller 4 for a drive belt (not illustrated) rotatably supported thereon by a conventional ball bearing 3. The support body 1, 2 is formed of a solid pin 1 and a cup-shaped cover 2. The ball bearing 3 is pushed upon a substantially cylindrical seating surface and against a bearing shoulder 5 of the pin 1, with the end of the seating surface extending axially beyond the other side surface of the ball bearing 3. The cup-shaped cover 2 has a bore surface engaging this seating surface, with the end face 6 thereof abutting the side surface of the inner ring 7 of the ball bearing 3. Both the pin 1 and the cover 2 have eccentric bores 8, through which a mounting screw 9 may extend, the screw 9 on the one hand mounting the tension roller to a machine part 10 and on the other hand clamping the ball bearing 3 between the pin 1 and the cover 2. The eccentric bores 8 are so positioned that the screw 9 engages the bore surface of the inner ring 7, although permitting easy rotational movement thereabout.

Figure 2:
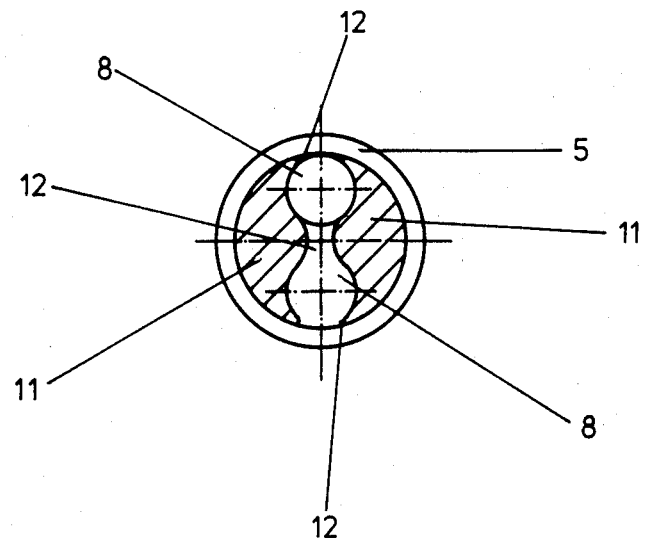
FIG. 2 is a transverse, cross-sectional view of the tension roller of FIG. 2 taken along the line A-B.

The pin 1 is produced by extrusion molding. As a consequence of this method of production, a uniform flow of the material in the axial direction results, as illustrated in FIG. 2 thereby providing two symmetrically arranged eccentric bores 8, only one of which however is employed for receiving the screw 9. In this manner the material parts 11 can be symmetrically formed in the axial direction so as to only partly encircle the eccentric bores 8. Due to the use of a forming die, spaces that are not essential for the mounting of the pin 1 are left free, so that open transitions 12 between the two bores 8 and over the outer surface of the pin 1 result. Due to the engagement of the shaft of the screw 9 on the bore surface of the inner ring, the greatest possible eccentricity and thereby the greatest possible tension range for the tension roller are achieved, in accordance with the invention.

While the invention has been disclosed and described with reference to a single embodiment, it will be apparent that variations and modifications may be made therein, and it is therefore intended in the following claims to cover each such variation and modification as falls within the true spirit and scope of the invention.

What is claimed is:

1. In a tension roller for drive belts, comprised of a support having a first eccentric bore, a rolling bearing having an inner ring mounted on a bearing seat of said support, and a roller rotatably arranged on said support by means of said rolling bearing, wherein said support is fastened to a machine frame by a screw arranged in said first eccentric bore and is eccentrically adjustable by rotation about said screw, the improvement wherein said support comprises a substantially solid pin on which said bearing seat is formed and a cup-shaped cover which engages said bearing seat, and said screw abuts said inner ring.

2. The tension roller of claim 1, wherein said support has a second eccentric bore symmetrically positioned with respect to said first eccentric bore.

3. The tension roller of claim 1, wherein said support is made of plastic material.

* * * * *